United States Patent [19]
Sagastegui et al.

[11] Patent Number: 5,379,923
[45] Date of Patent: Jan. 10, 1995

[54] HOPPER FOR A WEIGHING MACHINE

[75] Inventors: Javier Sagastegui, Danville; George A. Puricelli, Pleasanton; William E. Halopoff, Morgan Hill, all of Calif.

[73] Assignee: Eagle Packaging Corp., Oakland, Calif.

[21] Appl. No.: 899,776

[22] Filed: Jun. 17, 1992

[51] Int. Cl.$^6$ ............................................. B65D 47/00
[52] U.S. Cl. .................... 222/181; 222/503; 222/504; 222/505; 222/556; 177/108
[58] Field of Search ............... 222/502, 503, 504, 505, 222/506, 181, 185, 556, 77; 177/105, 108, 112

[56] References Cited

U.S. PATENT DOCUMENTS

| | | | |
|---|---|---|---|
| 1,272,515 | 7/1918 | Peck | 222/505 |
| 2,284,781 | 6/1942 | Ward | 222/503 |
| 2,387,585 | 10/1945 | Howard | 177/53 X |
| 2,638,254 | 5/1953 | Heltzel | 222/505 |
| 3,602,400 | 8/1971 | Cooke | 222/185 |
| 3,830,406 | 8/1974 | Robb | 222/185 X |
| 3,834,591 | 9/1974 | Pirovano | 222/185 |
| 4,043,491 | 8/1977 | Johnson et al. | 222/503 |
| 4,393,950 | 7/1983 | Klopfenstein et al. | 177/108 |
| 4,398,612 | 8/1983 | Mikami et al. | 177/25 |
| 4,466,500 | 8/1984 | Mosher et al. | 177/1 |
| 4,499,962 | 2/1985 | Izumi | 177/58 |
| 4,527,647 | 7/1985 | Ueda | 222/77 X |
| 4,545,446 | 10/1985 | Kokabu | 222/556 X |
| 4,550,792 | 11/1985 | Mosher et al. | 177/25 |
| 4,635,831 | 1/1987 | Kinoshita | 222/504 |
| 4,807,711 | 2/1989 | O'Brien et al. | 222/504 X |
| 4,844,292 | 7/1989 | Lonardi et al. | 222/503 |
| 4,848,605 | 7/1989 | Wise | 222/185 X |
| 4,874,048 | 10/1989 | Kawanishi et al. | 177/25.18 |

OTHER PUBLICATIONS

"Improvement in Jaw Shutter Design of Bunkers and Feeders," Vestnik Mashinostroeniya, vol. 55, Issue 9, 1975, p. 50., Russian Engineering Journal, vol. LV No. 9 (1975).

Primary Examiner—Andres Kashnikow
Assistant Examiner—Anthoula Pomrening
Attorney, Agent, or Firm—McCormick, Paulding & Huber

[57] ABSTRACT

A hopper for receiving and discharging product in a weighing machine has a construction comprised by a removable body shell and a supporting chassis. The shell has an opening at the top for receiving product to be weighed and an opening at the bottom for discharging the product after weighing. A discharge door cooperates with the opening at the bottom of the shell body to support the weight of product within the shell during weighing and to discharge the product after weighing. A quick-release coupling permits the hopper to be firmly installed on the weighing machine and to be quickly removed from the machine without tools. A toggle linkage is employed to operate the discharge door and locks the door in the closed position without further locking mechanisms. A bi-directional actuator moves the toggle linkage and door into and out of the closed position.

8 Claims, 3 Drawing Sheets

HOPPER FOR A WEIGHING MACHINE

BACKGROUND OF THE INVENTION

The present invention relates to weighing machines, and in particular to storage hoppers which receive and discharge product to be weighed in the course of weighing operations. Such hoppers, for example, may be a weighing hopper which is coupled to a transducer to generate a weight signal for subsequent processing. The storage hopper is especially useful in combination weighing machines in which a plurality of the hoppers receive and discharge product in a cyclic operation to generate charges of product for packaging.

Weighing machines which are commonly used in packaging operations generally include a plurality of weighing hoppers which periodically receive product to be weighed and discharged after a weight measurement has been taken. U.S. Pat. No. 2,387,585 illustrates a conventional packaging machine in which the weighing hoppers are an integral part of the charge-forming operation. More recently combination weighers of the type shown in U.S. Pat. No. 4,466,500 have assumed the charge-forming and weighing functions because of the high speed at which the machines can operate without reducing the accuracy of the weighing function. In combination weighers a plurality of weighing hoppers are used to continuously weigh small quantities of product, and the quantities are then combined in selected combinations to form charges of product closely approximating a given target weight.

In all types of weighing machines which generate signals indicative of the measured weight, it is preferable that such signals represent as much of the weight of product as possible and as little of the weight of the hopper as possible. For this reason range springs such as shown in U.S. Pat. No. 4,550,792 are sometimes added to the support mechanism for the hopper to carry a substantial portion of the "dead" weight of the hopper. Thus, the weight of the hopper does not appear in the signal derived from the strain gauge or other weight sensor and the total weight capacity of the sensor is confined to the range of product weights anticipated. Unfortunately, however, range springs are not permitted by many government or administrative regulations and, without other counterbalances for the dead weight of the hopper, as little as 20% of the weight signal may represent the useful load of product. Since the errors due to hysteresis and linearity are dependent on the total weight signal from the sensor, significant error can remain in the product weight component after the dead weight component has been subtracted.

In many weighing machines the hoppers frequently have a construction with the support structure, door hinges and operating linkages secured or suspended from the body. Examples of such hoppers are shown in U.S. Pat. Nos. 4,398,612 and 4,635,831 and 4,874,048. With a construction and hopper assembly of this type, the body itself must have a heavy gauge metal sufficient to carry the bearing loads and stresses that arise from the associated loads carried by the other structure and mechanisms. Such hopper structures are, therefore, relatively heavy structures and contribute to a significant portion of the weight measurements. The same hopper structures inhibit the use of different and less expensive materials, and are costly to manufacture due to the materials used and the polishing and other work that is needed for a sanitary finish.

In other designs, the hoppers have a partial frame for supporting the hopper body in part. Such hoppers are shown in U.S. Pat. Nos. 4,499,962, 4,527,647 and, 4,545,446. The partial frames reinforce the hopper body and thereby allow some reduction in weight through lower gauge metals, but still allocate some of the load bearing functions to the body. With such designs, the bodies must have sufficient strength to carry loads other than those from the weight of product, and the bodies and reinforcing frames are integrated structures inseparable from one another.

A further requirement of many weighing machines having a plurality of hoppers is ease of inspection, maintenance and disassembly for cleaning. For example, customers often specify that the hoppers must be removable from the weighing machine without tools. In accordance with these design requirements, weighing machines have releasable couplings between the hoppers and the machine frames. Examples of such hoppers and their couplings are shown in U.S. Pat. Nos. 4,398,612, 4,499,962 and 4,527,647. Because of the environment and the constant state of vibration that exists when such hoppers are operating, it is essential that the couplings hold the scales rigidly and securely to the machine. The objectives of a secure and rigid fastening along with ease of disassembly are generally in conflict and accordingly designing such couplings is a formidable task.

To minimize the "dead" weight of a hopper and at the same time to permit the hopper to be readily disassembled from the machine, it is customary to mount the actuating mechanism for opening and closing a discharge door on the frame of the machine and to transmit the driving motions to the door through an interrupted linkage. In this fashion the weight of the actuator does not become part of the sprung weight of the hopper. Examples of interrupted linkages are shown in U.S. Pat. Nos. 4,499,962, 4,527,647, 4,635,831 and 4,874,048. In such linkages the actuator is a uni-directional actuator which simply pushes one end of the operating rod against an operating linkage to cause the door to open, and a spring mechanism connected with the operating linkage returns the door to the closed position. Consequently, the spring is relied upon to hold the door closed and locked in opposition to the weight of product and the impact loads arising when product falls into the hopper.

It is accordingly a general object of the present invention to provide a weigh hopper which has a construction which allows different and lighter materials to be used in the non-stressed portions of the hopper so that the hopper has less weight and can be constructed for removability and at substantial cost saving over the conventional construction methods.

It is a further object of the present invention to provide a quick-release coupling which maintains the hopper rigid and securely connected to the machine frame during weighing operations and which releases the hopper from the machine frame simply and without tools when necessary for cleaning, repair or inspection.

It is still a further object of the present invention to provide a hopper with a discharge door and operating linkage that is easily released during hopper removal and, at the same time, securely closes and locks the door during cyclic filling and discharging operations.

SUMMARY OF THE INVENTION

The present invention resides in a storage hopper for receiving and discharging product in a weighing machine.

In one aspect of the invention, the hopper is constructed with a chassis or frame having a mounting for supporting a separate hopper body that receives and holds product until discharge. The hopper body includes mounting means for joining the body to the mounting of the hopper chassis and thus permits the body and the chassis to be constructed from different types of materials. For example, the chassis may be a heavy gauge steel while the body is made of light weight aluminum sheet metal or molded plastic. The mounting means on the body and the mounting on the hopper include a releasable coupling for removing the hopper or substituting another hopper. At least one discharge door connected with the assembled hopper body and chassis moves between a closed position in which the product is retained within the hopper and an open position for discharging product from the hopper.

In another aspect of the invention, a releasable coupling is employed for installing and removing the hopper in the weighing machine. The coupling includes a pair of hanger brackets which project laterally from the machine in spaced and parallel relationship. Each bracket has a hook on an upper part from which the hopper is suspended and two offset abutment tabs on the lower part. The hanger plate connected with the hopper has a notch in a lower edge which extends upwardly a distance equal to the distance between the hook and tabs on the hanger brackets. The notch is also defined by parallel side edges which are spaced to straddle the parallel brackets in close fitting relationship within slots that are formed between the tabs of the brackets. In this fashion the hopper is constrained against all movement other than lifting movement for quickly releasing the hopper from the machine.

In still a further aspect of the invention, a storage hopper used for receiving and discharging a product in a weighing machine has a hopper container with a discharge opening in a lower portion of the container for discharging product, and a discharge door pivotally mounted to the hopper container adjacent the discharge opening. The door is movable between an open and closed position by means of an operating linkage. The linkage includes a pair of toggle links that extend between a pivot point on the container and a pivot point on the door, and the links move through a toggle position to lock the door in the closed position independently of other operating mechanisms.

DESCRIPTION OF THE PREFERRED EMBODIMENTS

Figure 1:
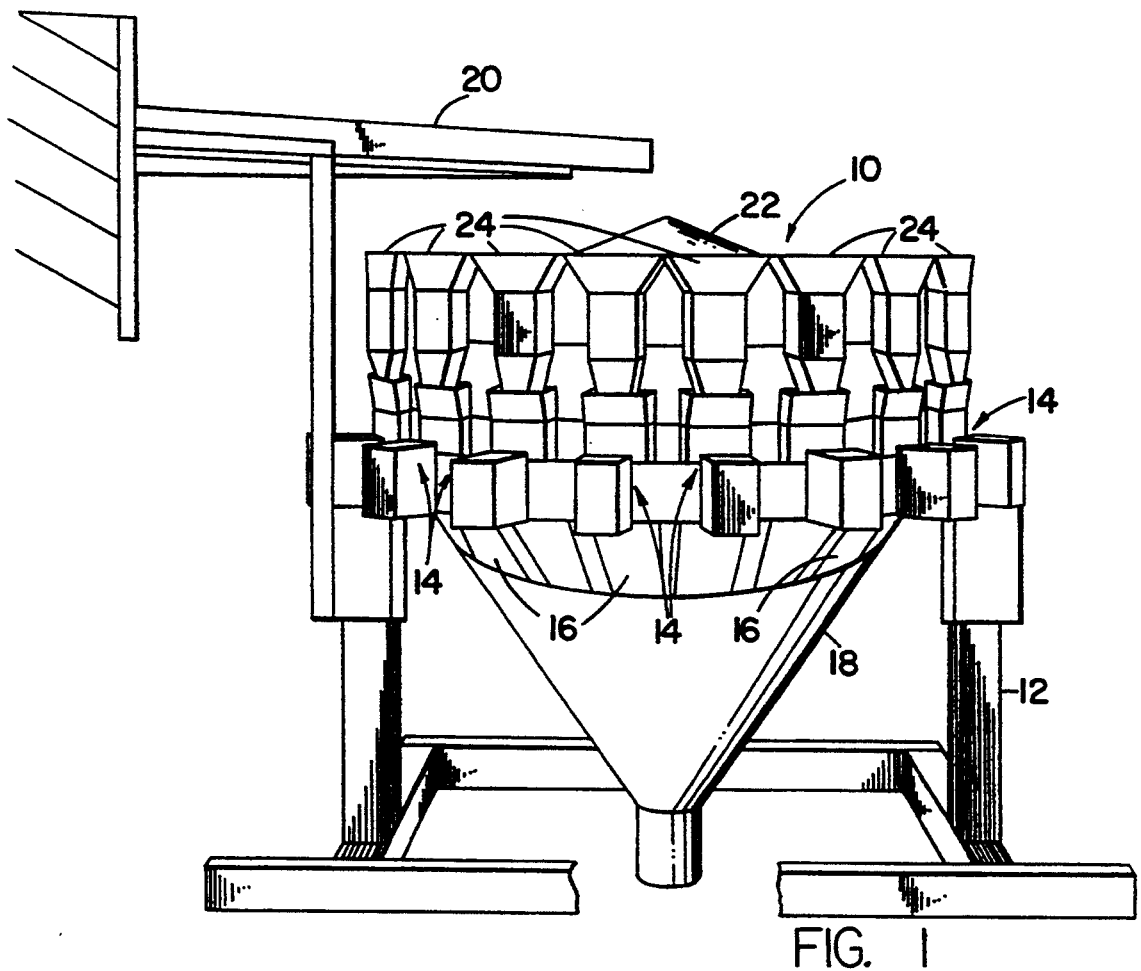
FIG. 1 illustrates a combination weighing machine having a plurality of weigh scales that include hoppers constructed in accordance with the present invention.

FIG. 1 illustrates a combination weighing machine, generally designated 10, which employs the hoppers of the present invention to produce a charge of product closely approximating a target weight. Products handled by the machine vary widely from finely divided foods such as candies or nuts to fruits, vegetables, frozen chicken parts and many non-food products, all of which must be generally flowable to pass through feeders and a discharge chute to a packaging machine below. In accordance with conventional combination weighing techniques, the machine 10 determines the weights of multiple quantities of the product and then selects a combination of the quantities having a total weight most closely approximating the target weight, and generally not less than the target weight, for discharge.

The combination weighing machine 10 has a frame 12 and a plurality of weigh scales 14 distributed in a circular array about a central, vertical axis of the machine. Each of the scales has an associated dump chute 16 which guides product discharged from the scales into a collector chute 18 for discharge into the associated packaging machine (not shown).

A bulk feed conveyor 20 at the top of the machine 10 delivers product from a storage bin (not shown) and keeps a supply of product available in a conical distribution tray 22 centrally above the circular array of weigh scales 14. Both the conveyor 20 and the tray 22 are provided with controlled vibrators to insure movement of the flowable product as needed into the machine.

A plurality of accumulator hoppers are distributed in a circular array about the distribution tray 22 and each hopper 24 receives product from the tray through an intermediate vibratory feeder (not shown). The accumulator hoppers are fed with a quantity of product which is coarsely equivalent to a fraction of the target weight. For example, the vibratory feeders may be selected to operate for a fixed period of time at a given amplitude to deliver between $\frac{1}{3}$ and $\frac{1}{4}$ of the product expected to be discharged from the combination weighing machine at the target weight. When a weigh scale 14 has dumped its charge of product into the collector chute 18, a waiting quantity of product in the associated accumulator hopper is dumped to refill the empty hopper of the weigh scale. Since the precise target weight of the product delivered to the packaging machine is achieved through the combination search and selection process, it is not necessary that the weight of product fed from the accumulator hoppers 24 to the weigh scales be precisely controlled. The weights need only be known with accuracy for the combination search and selection process. In fact, random variations in the weights are desired for selection of acceptable combinations.

Figure 2:
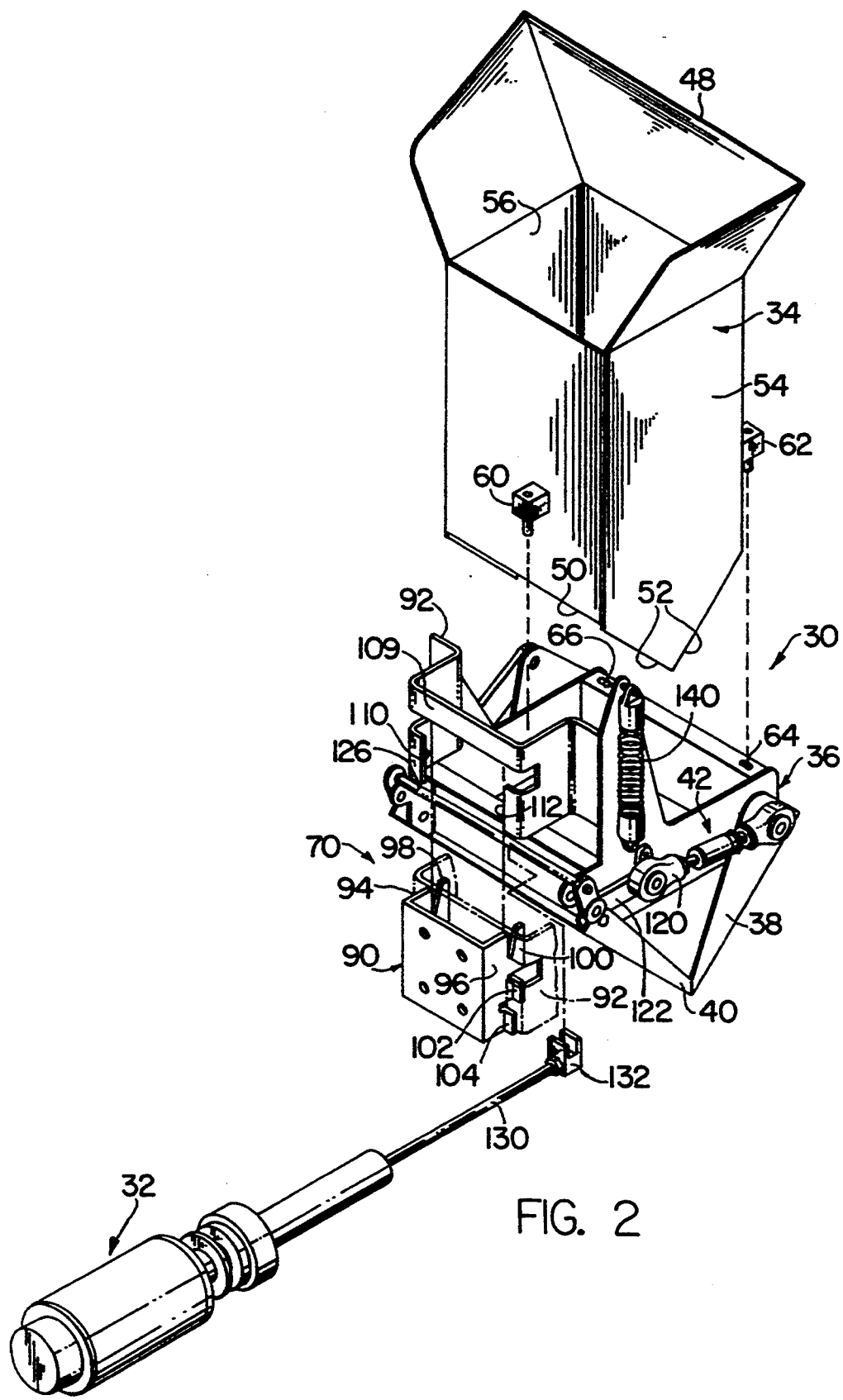
FIG. 2 is a perspective view of a hopper actuator and hopper from a weigh scale in FIG. 1 with the body shell lifted off of the hopper chassis.

In accordance with the present invention, FIG. 2 shows a storage hopper 30 and a bi-directional actuator 32 from one of the weigh scales 14 in FIG. 1. The hopper 30 receives a quantity of product to be weighed and stores that quantity of product until the quantity is selected to form a charge of product discharged to a packaging machine. The hopper is comprised basically of a hollow body shell 34, a chassis or frame 36 on which the body shell is mounted, a pair of discharge doors 38, 40 and a door operating linkage 42. In accordance with one aspect of the invention, the body shell is a separate component that can be removed for cleaning, inspection, and repair or alternatively, the body shell can be replaced with another body shell of different shape, volumetric capacity or material. In this manner different types of products can be handled by the weighing machine with a standardized chassis and operating mechanism for the discharge doors.

The pair of opposed and cooperating discharge doors 38,40 are mounted on the chassis 36 for pivotal movement between opened and closed positions. While it is necessary to have at least one discharge door for each hopper 30, two doors are shown in the illustrated embodiment to insure a rapid dumping of the product in the hopper when the quantity has been selected for discharge by the machine.

The hollow body shell 34 illustrated in the drawings has a flared opening at the top 48 for receiving product from the accumulator hopper above, an opening at the bottom 50 through which product is discharged when the doors 38, 40 are opened and a hollow passageway between the openings at the top and bottom through which all of the product to be weighed passes in a sequence of weighing and dumping operations. Naturally, the product is stored within the hollow body during the interval in which the flanged discharge doors 38,40 are closed. For this purpose, the bottom 50 of the body shell has angularly disposed edges 52 on two opposite sides 54,56 of the generally rectangular shell, and the angle of the edges 52 is cut to match the positions of the discharge doors in the closed position. Hence the weight of the product in the body shell will, for the most part, rest on the discharge doors, and the body shell 34 need only have sufficient strength to contain the product in a column within the body. The shell, therefore, can be constructed of a relatively light weight material, such as a thin gauge sheet metal or plastic. Correspondingly, the chassis 36 which supports the weight of product as well as the rest of the hopper 30 including the pivotally connected doors 38,40 and operating linkage 42 may be constructed with a heavier gauge metal in accordance with the prior art structures.

Therefore, one of the principal advantages of the hopper 30 with a separate body shell 34 and chassis 36 is that the hopper overall has a lighter weight and permits the use of lower range weight sensors. Lower range weight sensors lead to greater accuracy of weight readings since linearity and hysteresis are a percent of the total weight capacity of the weigh scale, and the weight of the product in the scale represents a higher portion of the total weight measurement. Correspondingly, with the lighter body shell, the total dead weight of the scale represents a smaller portion of the weight measurement.

The chassis 36 of the hopper 30 defines a generally rectangular passageway or opening corresponding to the cross section of the body shell 34, and the sides of the shell 34 fit telescopically within the frame opening so that product passing through the shell also passes through the chassis during discharge. In addition to the telescopic arrangement of the shell and chassis, a three-point mounting arrangement including three mounting pins and brackets 60,62 (two visible) mate with corresponding holes, 64,66 (two visible) in the chassis 36. The mating pins and holes comprise releasable couplings which allow the body shell to be easily removed from the chassis 36 for cleaning, repair or substitution of other body shells. The mounting pins 60,62 have snap-type fittings or releasable spring clips so that the body shell 34 cannot come loose on the chassis 36 when the pins are inserted in the holes 64,66. The removable body shell without tools has a very simple, light weight construction with a smooth interior because all of the complicated mechanical structures including pivot points and load bearing linkages and members are confined to the chassis 36.

Figure 3:
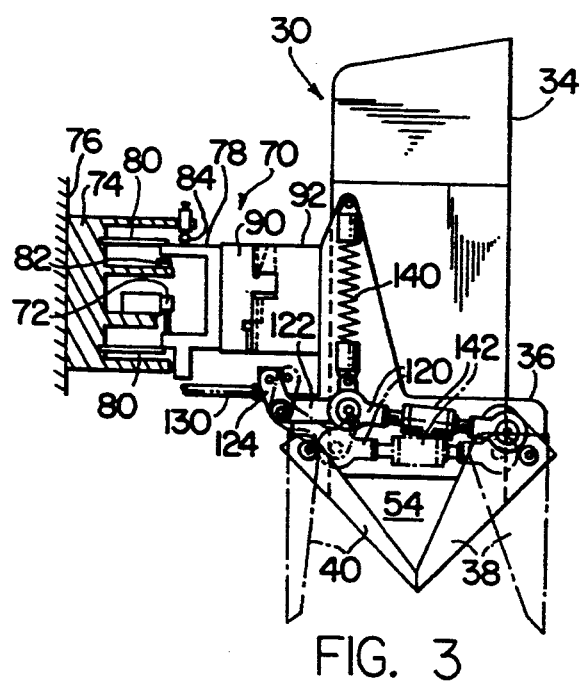
FIG. 3 is a right side elevation view of the hopper and quick-release coupling shown in FIG. 2 and the hopper suspension and weight sensors of a weigh scale.
Figure 4:
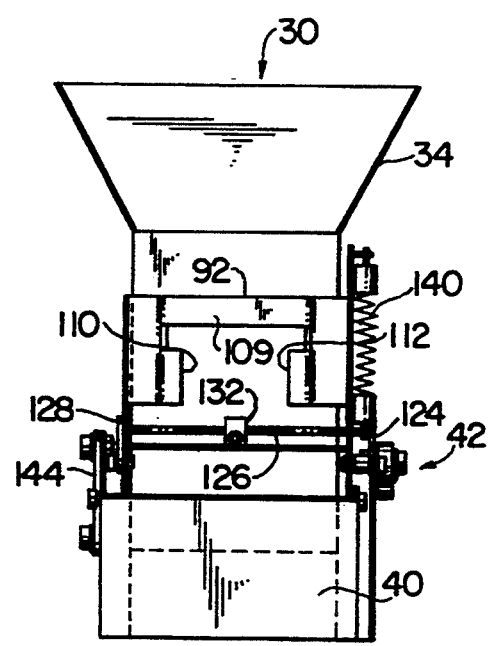
FIG. 4 is a front elevation view of the hopper in FIG. 2.

FIGS. 2 and 3 illustrate a quick-release coupling, generally designated 70, for installing, retaining and removing the hopper 30 in a weighing machine. Such couplings are generally required in most food weighing machines due to the frequency with which the machines must be disassembled for cleaning.

The coupling 70 connects the hopper 30 with the weight measuring portion of the weigh scale, including the strain gauge sensor 72 in FIG. 3. The sensor is mounted on a scale base 74 fixed to the machine frame 76 and is coupled to the hopper mount 78 which is resiliently suspended from the scale base by a pair of flexible leaf springs 80. A dash pot 82 for damping vibrations of the scale and a reference weight 84 for calibrating the scale readings may also be mounted on the scale frame 74.

Figure 6:
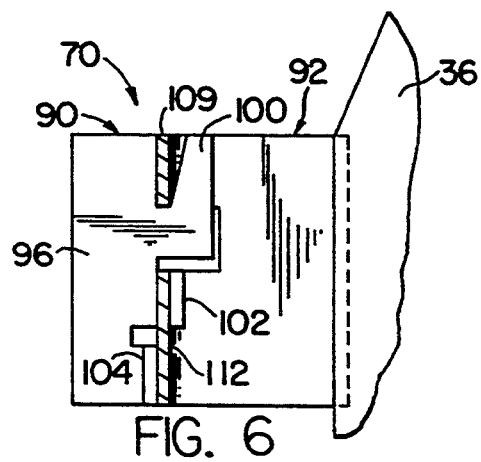
FIG. 6 is a fragmentary side elevation view showing the quick-release coupling in FIG. 2.
Figure 7:
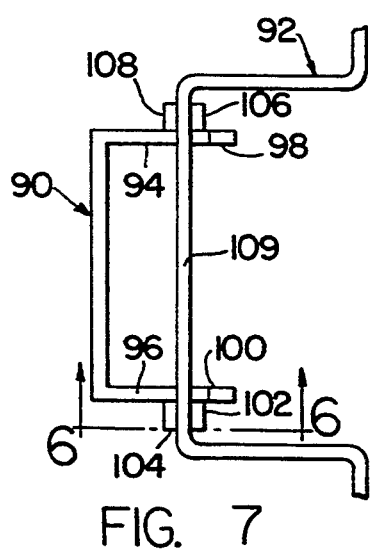
FIG. 7 is a fragmentary plan view of the quick-release coupling in FIG. 6.

FIGS. 2, 6 and 7 illustrate the quick-release coupling 70 in greater detail. The coupling 70 is a two-part structure having a hanger 90 which is secured to the hopper mount 78 and a hanger plate or bracket 92 which is secured to the hopper chassis 36. The hanger 90 is a U-shaped bracket plate and is comprised of two hanger brackets 94,96 which project outwardly from the weighing machine in spaced and parallel relationship. Each bracket includes on its upper part a hook 98 or 100 on which the hanger plate 92 is suspended. Each bracket also includes a set of abutment tabs 102,104 or 106,108 on the lower part of the bracket, and the tabs project laterally of the brackets. The tabs are positioned in a stepped relationship and define a slot between them which is directly below the valley of the hook 98 or 100 above so that the hanger plate 92 when suspended from the hook extends downwardly through the slot with the tab 102 on one side of the plate and the tab 104 on the opposite side of the plate as shown most clearly in FIGS. 6 and 7.

The hanger plate 92 has a rectangular notch extending upwardly from its lower edge a distance equal at least to the distance between the valley of the hook and the tabs on the hanger bracket and defines a bar 109 along the top of the notch. The parallel side edges 110,112 of the notch are spaced by the same amount as the hanger brackets 94,96 to straddle the brackets in close fitting relationship. With this arrangement the hopper is stabilized against rotation about all three coordinate axes by the quick-release coupling and will remain securely suspended from the weighing machine. In spite of the secure suspension, however, the hopper 30 can be easily lifted off of the hanger brackets for cleaning or servicing as needed.

The operating linkage 42 which opens and closes the discharge doors 38 and 40 on the hopper is supported on the chassis 36 along with the doors so that the hopper body shell 34 can be removed without disturbing or uncoupling the linkage. The operating linkage includes a pair of toggle links 120,122 which are self-locking to hold the doors in the closed position shown in FIG. 2 and in the solid-line positions of FIGS. 3 and 5. The toggle link 122 is one lever arm of a bell crank pivotally connected to the chassis frame above the door 40, and the toggle link 120 is pivotally connected at one end to the link 122 and at the opposite end to the other door 38. A second lever arm 124 of the bell crank is connected with the operating rod 130 of the bi-directional actuator 32 (FIG. 2). The connection is accomplished by means of a rigid yoke formed by the lever arm 124, a transverse bar 126 and a parallel arm 128 on the side of the hopper opposite from the arm 124. The operating rod 130 has a forked end 132 that straddles the transverse bar 126 when the hopper is suspended from the hanger 90.

Figure 5:
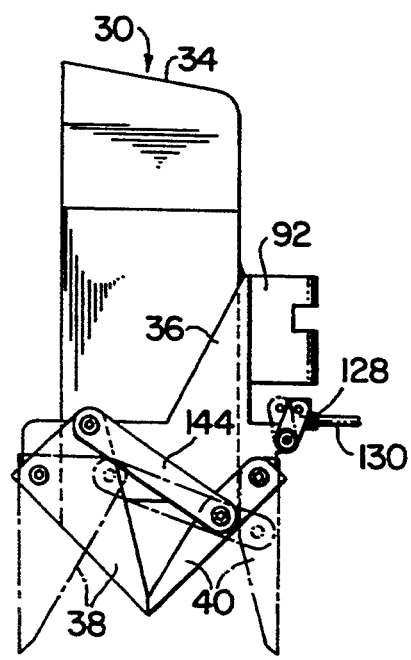
FIG. 5 is a left side elevation view of the hopper in FIG. 2.

The opening and closing motion of the doors produced by the toggle links 120,122 is applied directly to the door 38 by the link 120 and is transmitted from the door 38 to the door 40 through a transfer link 144 on the opposite side of the hopper 30 as shown in FIG. 5. Thus, the opening and closing movements of the doors 38,40 are coordinated and generated from the single bi-directional actuator. In the preferred embodiment the actuator is a reversible servomotor.

The toggle links 120,122 are shown in FIG. 3 in two extreme positions corresponding with the discharge doors 38,40 open and closed respectively. During operation the toggle links pass through the toggle position, that is when the links are precisely aligned with one another, shortly before the doors reach their fully closed position. To ensure locking in the closed position and to relieve stress as the links pass through the toggle position, a compliant link portion 142 of the link 120 provides a limited degree of compliance when the link is under compression.

Figure 8:
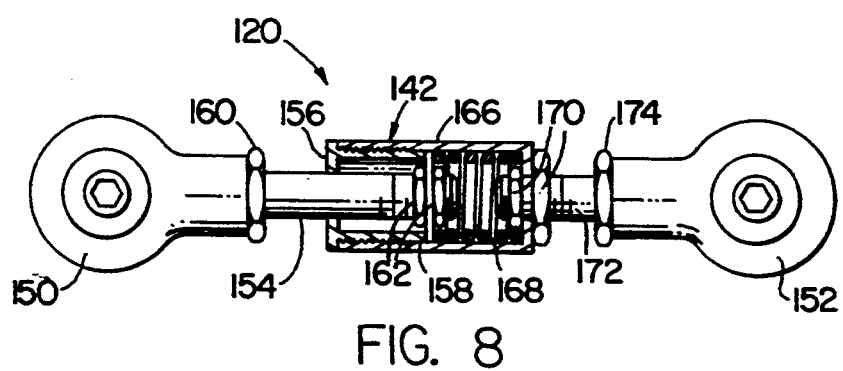
FIG. 8 shows a toggle link with a compliant link portion in section.

The detailed structure of the link 120 and compliant link portion 142 is illustrated more particularly in FIG. 8. The link 120 has a spherical rod end bearing 150 for connection with the link 122 and a spherical rod end bearing 152 for connection with the discharge door 38. The rod end bearing 150 is threadibly secured to a shaft 154 that passes through a cylinder plug 156 and an internal thrust washer 158. Lock nut 160 secures the rod end bearing at one end of the shaft 154 and two jam nuts 162 secure the washer 158 at the other end of the shaft. The cylinder plug 156 is threadibly engaged in one end of a cylinder 166, and clamps the washer 158 between the plug and a compression spring 168 captured within the cylinder 166. The relaxed length of the compression spring 168 is somewhat larger than the free space allotted in the cylinder by the plug so that the compression spring is under a slight preload and maintains the link 120 rigid up to the preload level. The rod end bearing 152 is secured to the end of the cylinder 166 by means of two jam nuts 170, a short shaft 172 and the lock nut 174.

The length of the toggle link 120 is adjusted to be slightly longer than the distance between the link 122 and the door 38 in the closed position so that the compliant link portion 142 actually holds the toggle linkage in the solid-line position shown in FIG. 3 due to the slight compressive force applied by the coil spring 168 within the compliant link portion. Thus the spring pressure holds the toggle linkage and the discharge doors locked in the closed position.

To open the doors the operating rod of the bi-directional actuator 32 must positively push against the rigid yoke formed by the toggle link 120 and move the links from the locked position through the toggle position to the open position of the links and the doors 38,40. As the toggle links 120,122 pass through the toggle position, the compression spring 168 is additionally compressed by a slight amount which relieves some of the stress and strain that would otherwise be applied to the links, the doors and the chassis. Thus in the closed position the links 120,122 have passed slightly beyond the toggle position and effectively lock the doors in the closed position. The coil spring 140 extending between the junction of the two links and the chassis is always in tension and insures that the links and doors are urged toward the closed position, but the spring is not essential.

When the command is given to discharge the quantity of product in the hopper 30, the operating rod 130 is pushed toward the hopper and causes the links to rotate from the locked or closed solid-line position through the toggle position to the unlocked or open position illustrated in phantom in FIGS. 3 and 5.

To close the doors, the operating rod 130 is positively pulled away from the hopper 30 by the bi-directional actuator 32, and the toggle links 120,122 are pulled through and slightly passed the toggle position to move further into the locking position with the doors closed. The slight compression load in the compliant link portion 142 of the link 120 holds the toggle links and the doors in the closed position. Thus the actuator 32 must be bi-directional in order to move the linkage in both directions through the toggle position for opening and closing the doors.

While the present invention has been described in a preferred embodiment, it should be understood that numerous modifications and substitutions can be made without departing from the spirit of the invention. For example, it is not essential that the hollow hopper body 34 fit telescopically within the frame 36. The body can be secured by any means on the chassis provided that the passageways between the hopper and chassis are in registration for receiving and discharging product. Although the body has been described in conjunction with a weigh scale, the hollow hopper body and separate frame can also be used for the accumulator hoppers or other hoppers on the weighing machine. As mentioned above while two doors have been shown for discharging product from the hopper, one door may suffice and the operating linkage employing two toggle links can be employed with the same advantage to hold the single door closed in a locked position of the linkage. The notch in the hanger plate 92 can be formed by two parallel slots that straddle the parallel hanger brackets 94,96 respectively with equivalent effects. Accordingly, the present invention has been described in several preferred embodiments by way of illustration rather than limitation.

We claim:

1. A hopper for receiving and discharging product in a weighing machine comprising:
   a hopper container having a charging opening in an upper container portion for receiving product and a discharge opening in a lower container portion for discharging product;
   a first discharge door pivotally mounted on the hopper container adjacent the discharge opening and movable between an open position to discharge product from the container and a closed position to retain product in the container; and an operating linkage mounted on the hopper container for moving the discharge door between the open and closed positions, the linkage including a pair of toggle links coupled to one another at a common connecting point and extending between a pivot point on the container where one of the toggle links is connected and a pivot point on the door where the other of the toggle links is connected, the toggle links being movable through a toggle position as the door approaches the closed position to a locking position as the door reaches the closed position, in the toggle position the common connecting point of the toggle links passing through a centerline extending between the pivot points and one of the toggle links having a compliant link portion for maintaining the links in the locking position.

2. A hopper as defined in claim 1 wherein:

a bi-directional actuator is provided; and the toggle link connected to the pivot point on the container is connected with the bi-directional actuator for moving the toggle links into and out of the locking position through the toggle position.

3. A hopper as defined in claim 2 wherein the actuator is a reversible servomotor.

4. A hopper as defined in claim 2 wherein:

the toggle link connected to the pivot point on the container has a first lever arm pivotally connected to the pivot point on the container and to the second link, and a second lever arm rigidly connected with the first lever arm to form a bell crank, the second lever arm being connected with the bi-directional actuator for operating the toggle links.

5. A hopper as defined in claim 4 wherein:

a yoke formed in part by the second lever arm of the bell crank is pivotally mounted on an axis passing through the pivot point on the container; and the bi-directional actuator is connected with the yoke.

6. A hopper as defined in claim 1 including:

a second discharge door pivotally mounted on the hopper container adjacent the discharge opening and movable between an open position and a closed position cooperatively with the first door to respectively discharge and retain product in the container.

7. A hopper as defined in claim 6 further including a transfer link connected between the first and second discharge doors to render the doors cooperatively movable between the open and closed positions.

8. A hopper as defined in claim 1 wherein spring means is connected to the toggle links for urging the links into the locking position.

* * * * *